United States Patent [19]

Jablonski

[11] 4,399,262

[45] Aug. 16, 1983

[54] ACRYLATE RUBBER COMPOSITIONS

[75] Inventor: Dane E. Jablonski, Brunswick, Ohio

[73] Assignee: The B. F. Goodrich Company, Akron, Ohio

[21] Appl. No.: 367,209

[22] Filed: Apr. 12, 1982

[51] Int. Cl.³ .............................................. C08F 4/50
[52] U.S. Cl. ................................ 525/349; 525/328.2; 525/328.5; 525/328.8; 525/328.9; 525/329.5; 525/329.8; 525/330.4
[58] Field of Search .................................... 525/349

[56] References Cited

U.S. PATENT DOCUMENTS

| | | | |
|---|---|---|---|
| 2,983,715 | 5/1961 | Fields | 525/349 |
| 2,983,716 | 5/1961 | Fields | 525/349 |
| 3,558,739 | 1/1971 | Kagarise | 525/349 |
| 3,875,092 | 4/1975 | Morris | 525/340 |
| 3,910,866 | 10/1975 | Morris | 525/329.5 |
| 4,128,510 | 12/1978 | Richwine | 525/349 |
| 4,248,985 | 2/1981 | Ohishi et al. | 525/349 |
| 4,288,576 | 9/1981 | Richwine | 525/349 |

*Primary Examiner*—Joseph L. Schofer
*Assistant Examiner*—Bernard Lipman
*Attorney, Agent, or Firm*—J. Hughes Powell, Jr.

[57] ABSTRACT

Dual cure site acrylate rubbers having both carboxyl and active halogen groups are compounded with a combination of 2,3-dimercapto-1,3,4-thiadiazole and a Group IB, IIB, IVA, VA, or VIA metal compound of a tetraalkyl thiuram sulfide to provide compounded acrylate rubbers having an excellent scorch/cure rate balance and desirable physical properties in the vulcanizates thereof.

9 Claims, No Drawings

4,399,262

ACRYLATE RUBBER COMPOSITIONS

BACKGROUND OF THE INVENTION

Acrylate rubbers and elastomers that contain both halogen and carboxyl cure sites are known. U.S. Pat. No. 3,910,866 describes the vulcanization of such elastomers with a combination of an alkali metal oxy compound and a quaternary ammonium salt, a tertiary amine or a guanidine. U.S. Pat. No. 3,875,092 discloses the cure of such dual cure site acrylate elastomers with a quaternary ammonium salt. While these and other cure systems have been used to vulcanize the halogen and carboxyl containing acrylte elastomers, improved cure systems are desired that will provide a better balance of physical properties in the vulcanizates as well as an improved scorch/cure rate balance.

SUMMARY OF THE INVENTION

Acrylate rubber compositions containing both halogen and carboxyl cure sites having an improved scorch/cure rate balance, and physical property balance in the resulting vulcanizates, are obtained when the acrylate rubbers are compounded with a combination of 2,5-dimercapto-1,3,4-thiadiazole and a Group IB, IIB, IVA, VA or VIA metal tetraalkyl thiuram sulfide.

DETAILED DESCRIPTION

The acrylate rubbers are interpolymers comprising at least one acrylic ester monomer, a reactive halogen-containing monomer, and a carboxyl-containing monomer.

The acrylate rubbers contain from about 40% to about 98% by weight, based upon the weight of the polymer, of an acrylic ester of the formula

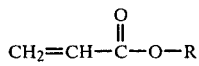

wherein R is an alkyl radical containing 1 to 18 carbon atoms, an alkoxyalkyl or alkylthioalkyl radical containing a total of 2 to about 12 carbon atoms, or a cyanolakyl radical containing 2 to about 12 carbon atoms. The alkyl structure can be primary, secondary, or tertiary. Examples of such acrylates are methyl acrylate, ethyl acrylate, propyl acrylate, n-butyl acrylate, isobutyl acrylate, n-pentyl acrylate, isoamyl acrylate, n-hexyl acrylate, 2-methyl-pentyl acrylate, n-octyl acrylate, 2-ethylhexyl acrylate, n-decyl acrylate, n-dodecyl acrylate, n-octadecyl acrylate, and the like; methoxymethyl acrylate, methoxyethyl acrylate, ethoxyethyl acrylate, butoxyethyl acrylate, ethoxypropyl acrylate; methylthioethylacrylate, hexylthioethylacrylate, and the like; and α and β-cyanoethyl acrylate, α, β and γ-cyanopropyl acrylate, cyanobutyl acrylate, cyanohexyl acrylate, cyanooctyl acrylate, and the like. Mixtures of two or more monomers and/or types of acrylate monomers are employed.

Preferredly, the rubbers contain from about 65% to about 98% by weight of acrylates of the formula wherein R is an alkyl radical containing 1 to about 10 carbon atoms or an alkoxyalkyl radical containing 2 to about 8 carbon atoms. Examples of the more preferred acrylates are ethyl acrylate, propyl acrylate, n-butyl acrylate, hexyl acrylate, 2-ethylhexyl acrylate, octyl acrylate, and the like; and methoxyethyl acrylate, ethoxyethyl acrylate, and the like. Both an alkyl acrylate and an alkoxyalkyl acrylate can be used.

The rubbers contain from about 0.1% to about 30% by weight of an active halogen-containing monomer. The halogen groups can be chlorine, bromine or iodine. These monomers are generally (1) halogen-containing vinylene hyrocarbons and (2) halogen-containing vinyl monomers having the halogen group at least two carbon atoms removed from an oxygen atom(s). Examples of (1) are vinyl benzyl chloride, vinyl benzyl bromide, 2-chloromethyl-5-norbornene, 2-bromomethyl-5-norbornene, 2-β-chloroethyl-5-norbornene, and the like; (2) are characterized by having ether (—O—), ketone

or ester

structures in the monomer where the halogen group is at least 2 carbon atoms and up to 6 or more carbon atoms removed from an oxygen atom. Examples of these monomers are halogen-containing vinyl esters such as vinyl chloroacetate, cyclol chloroacetate, vinyl bromoacetate, allyl chloroacetate, vinyl 3-chloropropionate, vinyl 4-chlorobutyrate, vinyl 4-bromobutyrate, and the like; halogen-containing acrylates such as 2-chloroethyl acrylate, 3-chloropropyl acrylate, 4-chlorobutyl acrylate, 2-chloroethyl methacrylate, 2-bromoethyl acrylate, 2-iodoethyl acrylate, 4-chloro-2-butenyl acrylate, 2-chloroacetoxyethyl acrylate and methacrylate, and the like; halogen-containing vinyl ethers such as 2-chloroethyl vinyl ether; halogen-containing vinyl ketones such as chloromethyl vinyl ketone, 2-chloroethyl vinyl ketone, and the like; and 2-chloroacetoxymethyl-5-norbornene, 2-(α,β-dichloropropionylmethyl)-5-norbornene, and the like.

More preferably, the rubber contains from about 0.2% to about 15% by weight of the active halogen-containing monomer. At this level, the halogen content is from about 0.1% to about 5% by weight of the rubber. Due to availability and cost, the chlorine-containing monomers are preferred. Examples of the more preferred monomers are vinyl chloroacetate, allyl chloroacetate, 2-chloroethyl acrylate, 2-chloroethyl vinyl ether, 3-chloropropyl acrylate, cyclol chloroacetate, chloromethyl vinyl ketone, vinyl benzyl chloride, 2-chloromethyl-5-norbornene, 2-chloroacetoxyethyl acrylate and methacrylate, and 2-chloroacetoxymethyl-5-norbornene.

The rubbers also contain from about 0.1% to about 20% by weight of a carboxyl-containing monomer. The monomer can be monocarboxylic or poly-carboxylic, containing from 3 to about 8 carbon atoms. Examples of such monomers are acrylic acid, methacrylic acid, ethacrylic acid, β,β-dimethyl acrylic acid, crotonic acid, 2-pentenoic acid, 2-hexenoic acid, maleic acid, fumaric acid, citraconic acid, mesaconic acid, itaconic acid, 3-butene-1,2,3-tricarboxylic acid, and the like.

More preferably, the rubber contains from about 0.2% to about 10% by weight of the carboxyl-containing monomer. At this level, the carboxyl content is from about 0.1% to about 7% by weight of the rubber. The more preferred monomers are the monocarboxylic acid monomers such as acrylic acid, methacrylic acid, itaconic acid, and the like.

The rubber can contain up to about 35% and preferably up to about 10% by weight of other copolymerizable vinylidene monomers having a terminal vinylidene ($CH_2<$) group. Examples of such are phenyl acrylate, cyclohexyl acrylte, methacrylates such as methyl methacrylate, ethyl methacrylate, octyl methacrylate, and the like; vinyl and allyl esters such as vinyl acetate, vinyl propionate, allyl acetate, and the like; alkyl vinyl ketones such as methyl vinyl ketone; vinyl and allyl ethers such as vinyl methyl ether, vinyl ethyl ether, allyl methyl ether, and the like; vinyl aromatics such as styrene, α-methyl styrene, chlorostyrene, vinyl toluene, and the like; vinyl chloride, vinylidene chloride; alkyl fumarates, vinyl nitriles such as acrylonitrile and methacrylonitrile; vinyl amides such as acrylamide, methacrylamide, N-methylol acrylamide, and the like; and dienes and divinyls such as butadiene, isoprene, divinyl benzene, divinyl ether, diethylene glycol diacrylate, glycidyl acrylate and methacrylate, and the like. The more preferred copolymerizable monomers are vinyl acetate, methyl methacrylate, ethyl methacrylate, styrene, acrylonitrile, acrylamide, and diethylene glycol diacrylate.

The acrylate rubbers can be prepared using emulsion, suspension, solution, and bulk techniques known to those skilled in the art. It is convenient to polymerize the monomers to 90 percent conversion or more by emulsion and suspension techniques. The polymerization can be performed as a batch reaction, continuous, or one or more ingredients can be proportioned during the run. Temperature of polymerization ranges from about $-10°$ C. to about 100° C., whereas a more preferred range is from about 5° C. to about 80° C.

The polymerization can be initiated by free-radical generating agents. Examples of such agents are inorganic peroxides and organic peroxides and hydroperoxides such as benzoyl peroxide, dicumyl peroxide, cumene hydroperoxide, paramenthane hydroperoxide, and the like, used alone or with redox systems; diazo compounds such as azobisisobutyronitrile, and the like; persulfate salts such as sodium, potassium, and ammonium persulfate, used alone or with redox systems; and the use of ultraviolet light with photosensitive agents such as benzophenone, triphenylphosphine, organic diazos, and the like.

Typical emulsion polymerization ingredients would include a persulfate salt or organic peroxide and usually a redox system, water adjusted to a desired pH with acids or bases and usually buffered with inorganic salts, and either anionic, cationic, or nonionic surface active agents well known to the art, including alkali alkyl sulfonates, aralkyl sulfonates and polyglycol fatty acids.

The polymerization normally is continued until about 95% conversion of monomers is obtained. The resulting latex can be coagulated to isolate the polymer. Typical coagulation procedures are salt/acid coagulations, use of polyvalent metal salts such as $MgSO_4$, use of alcohols such as methanol and isopropyl alcohol, spray drying and freeze agglomeration techniques. The rubber is usually washed with water and dried.

The acrylate rubbers are solid elastomers having a dilute solution viscosity (DSV) of over 0.5 as measured on 0.2 gram of rubber in 100 ml. benzene at 25° C. Raw polymer Mooney values (ML-4, at 221° F.) are from about 20 to about 125.

The rubbers are admixed with cure ingredients and compounding ingredients using two-roll mills, internal mixers such as Banburys and extruders, and like equipment.

The metal compound contains a metal of Groups IB, IIB, IVA, VA, and VIA of the Periodic Chart of the elements. Typical salts include copper tetramethyl thiuram disulfide, zinc tetraethyl thiuram disulfide, lead tetramethyl thiuram disulfide, bismuth tetramethyl thiuram disulfide, tellurium tetraethyl thiuram disulfide, zinc tetrabutyl thiuram disulfide, tin tetrabutyl thiuram disulfide and the like.

The tetraalkyl thiuram sulfides used include the monosulfide, disulfide, tetrasulfide and hexasulfide, however, the disulfide is normally preferred. The alkyl group may contain from 1 to 6 carbon atoms as methyl, ethyl, propyl, butyl and the like. While any of these tetraalkyl thiuram disulfides may be used, a better balance of properties in the compound and vulcanizate is often observed when the tetramethyl, tetraethyl and tetrabutyl disulfide derivatives are used.

The amounts and ratios of 2,5-dimercapto-1,3,4-thiadiazole and metal salt of tetraalkyl thiuram sulfide may be varied widely to obtain a variety of properties. A particularly useful range is from about 0.4 to about 2.0 weight part of 2,5-dimercapto-1,3,4-thiadiazole about 1 to about 6 weight parts of the metal tetraalkyl thiuram sulfide per 100 weight parts of acrylate rubber. Excellent results have been obtained with about 0.5 to 1.0 weight part of thiadiazole and about 2 to 5 weight parts of tetrabutyl thiuram disulfide metal salt.

The acrylate rubbers can be admixed with many other rubber compounding ingredients. Examples of such ingredients are fillers such as the carbon blacks, silica, aluminum silicates, phenol-formaldehyde and polystyrene resins, asbestos, and the like; plasticizers and extenders such as dialkyl and diaryl organic esters like diisobutyl, diisooctyl, and dibenzyl sebacates, azelates, phthalates, and the like; petroleum oils, castor oil, tall oil, glycerin, and the like; antioxidants and stabilizers such as phenyl-B-naphthylamine, 2,6-di-t-butyl paracresol, 2,2'-methylenebis(4-ethyl-6-t-butyl pheno), 2,2'-thiobis-(4-methyl-6-t-butyl phenol), 4,4'-butylidenebis-(6-t-butyl-m-cresol), tris-(3,5-di-t-butyl-4-hydroxybenzyl) isocyanurate, tetrakis-methylene-3(3', 5'-di-t-butyl-4'-hydroxyphenyl) propionate methane, distearyl thiodipropionate, tri(nonylatedphenyl) phosphite, and the like; and other ingredients such as processing aids, pigments, tackifiers, flame retardants, fungicides, and the like.

The novel compositions are cured at temperatures from about 250° F. to about 450° F., whereas a more preferred range is from about 275° F. to about 400° F. Cure times vary inversely as temperature, and range from about 1 minute to about 60 minutes or more.

The vulcanizates were evaluated as to their compression set (ASTM D395), tensile and elongation (ASTM D412), and hardness (ASTM D2240-durometer A). Cure times were determined using a Mooney Viscometer (ASTM D1646) with a large rotor, or using a Monsanto Rheometer (ASTM D2084). The samples were press cured and then oven cured.

The following examples serve to more fully illustrate the practice of the invention.

EXAMPLE

The acrylate rubber of this example contains 98 weight percent ethyl acrylate, 1.6 weight percent vinyl benzyl chloride and 0.4 weight percent methacrylic acid. The rubber had a Mooney value of 50 ML. A masterbatch containing the rubber, processing aid, stearic acid and carbon black was prepared in an internal mixer. The curing agents used, and the amounts, are shown in the Table. The curing combination includes 2,5-dimercapto-1,3,4-thiadiazole and the following metal compounds of the tetraalkyl thiuram sulfides: copper tetramethyl thiuram disulfide (CuTMTD), zinc tetraethyl thiuram disulfide (ZnTETD), lead tetramethyl thiuram disulfide (PbTMTD), bismuth tetramethyl thiuram disulfide (BiTMTD) and tellurium tetraethyl thiuram disulfide (TeTETD), added to the masterbatch portions, and the compounds were tested and cured as shown in the table.

TABLE

| Compound | 1 | 2 | 3 | 4 | 5 |
|---|---|---|---|---|---|
| Acrylate Rubber | 100 | 100 | 100 | 100 | 100 |
| Processing Aid* | 2 | 2 | 2 | 2 | 2 |
| Stearic Acid | 1 | 1 | 1 | 1 | 1 |
| Philblack N-550** | 65 | 65 | 65 | 65 | 65 |
| 2,5-dimercapto-1,3,4-thiadiazole | 0.6 | 0.6 | 0.6 | 0.6 | 0.6 |
| CuTMTD | 2.0 | — | — | — | — |
| ZnTETD | — | 2.0 | — | — | — |
| PbTMTD | — | — | 2.5 | — | — |
| BiTMTD | — | — | — | 3.0 | — |
| TeTETD | — | — | — | — | 4.0 |
| Mooney Viscometer (125° C., Large Rotor) | | | | | |
| Minimum | 53 | 54 | 60 | 51 | 90 |
| $T_5$, minutes | 11.3 | 4.0 | 4.6 | 12.9 | 2.0 |
| $T_{35}$, minutes | >30 | 7.2 | >30 | >30 | — |
| Rheometer (20', 190° C., Micro Die) | | | | | |
| $M_L$, (in-lb) | 7.0 | 7.8 | 7.3 | 6.5 | 8.3 |
| $M_H$, (in-lb) | 15.8 | 20.8 | 17.4 | 19.2 | 20.6 |
| $M_{66}$, (in-lb) | 8.8 | 13.0 | 10.1 | 12.7 | 12.3 |
| $t^1$, minutes | 1.1 | 0.7 | 0.8 | 0.9 | 0.4 |
| $t_{90}{}^1$, minutes | 7.5 | 9.5 | 7.5 | 12.5 | 4.0 |
| Press Cure (3', 190° C.) | | | | | |
| Modulus 100%, psi | 600 | 660 | 600 | 650 | 850 |
| Tensile, psi | 1220 | 1650 | 1500 | 1430 | 1800 |
| Elongation, % | 310 | 320 | 300 | 330 | 240 |
| Hardness-A | 72 | 73 | 73 | 73 | 70 |
| % C.S. (70 hr/150° C.) | | | | | |
| 6' Button | 78 | 59 | 67 | 70 | 79 |
| Post Cure (4 hr., 175° C.) | | | | | |
| Modulus 100%, psi | 680 | 1020 | 780 | 850 | 1150 |
| Tensile, psi | 1580 | 2100 | 1820 | 1900 | 2110 |
| Elongation, % | 280 | 200 | 230 | 230 | 160 |
| Hardness-A | 75 | 78 | 76 | 78 | 73 |
| % C.S. (70 hr/150° C.) | | | | | |
| 6' Button | 67 | 43 | 55 | 48 | 54 |

*Zinc stearate, fatty acid processing aid.
**Furnace Black

The curing combination of this invention provides compositions with varying scorch/cure balances, and a broad range of physical properties, thus providing latitude for a wide range of applications. The copper compound had good process safety; the zinc compound had improved out of the mold tensile strength; the bismuth compound had good process safety; and the tellurium compound showed a rapid cure rate and improved tensile strength.

The vulcanized acrylate rubbers are used in many applications where weatherability, high temperature resistance and oil resistance are required. Such applications include under the hood automobile parts, including gaskets, seals, packing, belting and hose; outdoor applications such as weather stripping, sealants and hose; oil field applications in seals, gaskets and the like.

I claim:

1. A composition comprising (1) an acrylate rubber containing (a) from about 40 percent to about 98 percent by weight of an acrylate of the formula

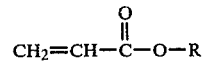

wherein R is selected from the group consisting of an alkyl radical containing 1 to 18 carbon atoms, an alkoxyalkyl, an alkylthioalkyl, and a cyanoalkyl radical containing 2 to about 12 carbon atoms, (b) from about 0.1 percent to about 30 percent by weight of a halogen-containing monomer selected from the group consisting of halogen-containing vinylene hydrocarbons and halogen-containing vinyl monomers having the halogen group at least two carbon atoms removed from an oxygen atom, (c) from about 0.1 percent to about 20 percent by weight of an unsaturated carboxyl-containing monomer, and (d) up to 35 percent by weight of a copolymerizable monomer containing a terminal vinylidene group, and (2) as the curative, vulcanizing amounts of 2,5-dimercapto-1,3,4-thiadiazole and a Group IB, IIB, IVA, VA or VIA metal salt of a tetraalkyl thiuram sulfide.

2. A composition of claim 1 wherein (1) is an acrylate rubber of (a) from about 65 percent to about 98 percent by weight of an acrylate wherein R is selected from the group consisting of alkyl radicals containing 1 to about 10 carbon atoms and alkoxyalkyl radicals containing 2 to about 8 carbon atoms, (b) from about 0.2 percent to about 15 percent by weight of a halogen-containing monomer, (c) from about 0.2 percent to about 10 percent by weight of a carboxyl-containing monomer, and (d) up to about 10 percent by weight of a copolymerizable monomer containing a terminal vinylidene group and about 0.4 to about two weight part of 2,5-dimercapto-1,3,4-thiadiazole, 1.0 to 6.0 weight parts of a tetraalkyl thiuram disulfide compound wherein the alkyl groups contain 1 to 6 carbon atoms, all weights based on 100 weight parts of acrylate rubber.

3. A composition of claim 2 wherein (a) is selected from the group consisting of ethyl acrylate, n-butyl acrylate, methoxyethyl acrylate and ethoxyethyl acrylate, (b) is selected from the group consisting of vinyl chloroacetate, allyl chloroacetate, 2-chloroethyl acrylate, 2-chloroethyl vinyl ether, vinyl benzyl chloride, 2-chloromethyl-5-norbornene, and 2-chloroacetoxymethyl-5norbornene, and (c) is selected from the group consisting of acrylic acid, methacrylic acid, and itaconic acid, containing about 0.5 to 1.0 weight parts of said thiadiazole, about 2 to 5 weight parts of metal tetraalkyl thiuram disulfide.

4. A composition of claim 3 wherein the metal is selected from the group consisting of copper, zinc, lead, bismuth and tellurium.

5. A composition of claim 4 wherein (a) is ethyl acrylate, (b) is vinyl benzyl chloride in amount of about 1 to 2 weight percent, (c) is acrylic or methacrylic acid in amount of about 0.2 to 0.6 weight percent and there is present about 0.6 weight parts of thiadiazole, about 2.0 to 4.0 weight parts of a zinc or tellurium tetramethyl, tetraethyl, or tetrabutyl thiuram disulfide.

6. A composition of claim 5 wherein the disulfide is tetrabutyl thiuram disulfide.

7. A composition of claim 3 wherein the tetraalkyl group of the thiuram disulfide is tetramethyl, tetraethyl or tetrabutyl.

8. A composition of claim 4 wherein the tetraalkyl group of the thiuram disulfide is tetramethyl, tetraethyl or tetrabutyl.

9. A composition of claim 8 wherein (a) is ethyl acrylate, (b) is vinyl benzyl chloride and (c) is acrylic acid.

* * * * *